(No Model.)

M. STECHER.
SECONDARY BATTERY.

No. 378,629. Patented Feb. 28, 1888.

WITNESSES

INVENTOR
Max Stecher
BY
Goepel & Raegener
ATTORNEYS.

UNITED STATES PATENT OFFICE.

MAX STECHER, OF PHILADELPHIA, PENNSYLVANIA, ASSIGNOR OF ONE-HALF TO CHARLES WIEGMANN, OF SAME PLACE.

SECONDARY BATTERY.

SPECIFICATION forming part of Letters Patent No. 378,629, dated February 28, 1888.

Application filed March 18, 1887. Serial No. 231,349. (No model.)

*To all whom it may concern:*

Be it known that I, MAX STECHER, of the city and county of Philadelphia, State of Pennsylvania, have invented certain new and useful Improvements in Secondary Batteries, of which the following is a specification.

This invention relates to certain new and useful improvements in secondary or storage batteries; and the object of my invention is to provide a battery of this kind in which a large surface of active material can be held in a comparatively small space, and in which battery the oxide of lead or exciting material is not apt to become detached from the plates and drop off, as is usually the case in most of the secondary batteries in use heretofore.

The invention consists of a secondary battery formed of a series of porous cells and sheet-lead cylinders arranged alternately, the space between the cells and cylinders being filled with oxide and the lead plates connected with each other, all as will be fully described and set forth hereinafter, and finally pointed out in the claims.

Figure 1:
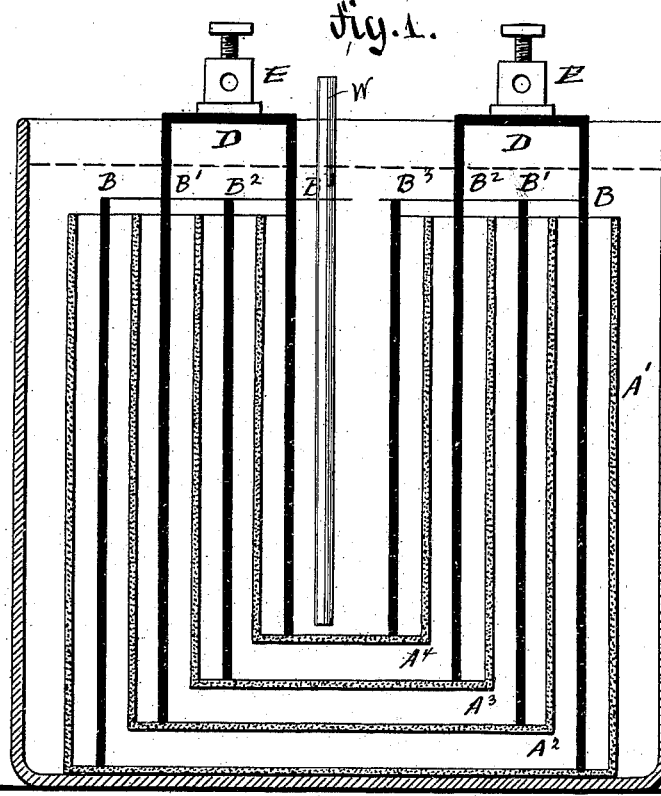
Figure 2:
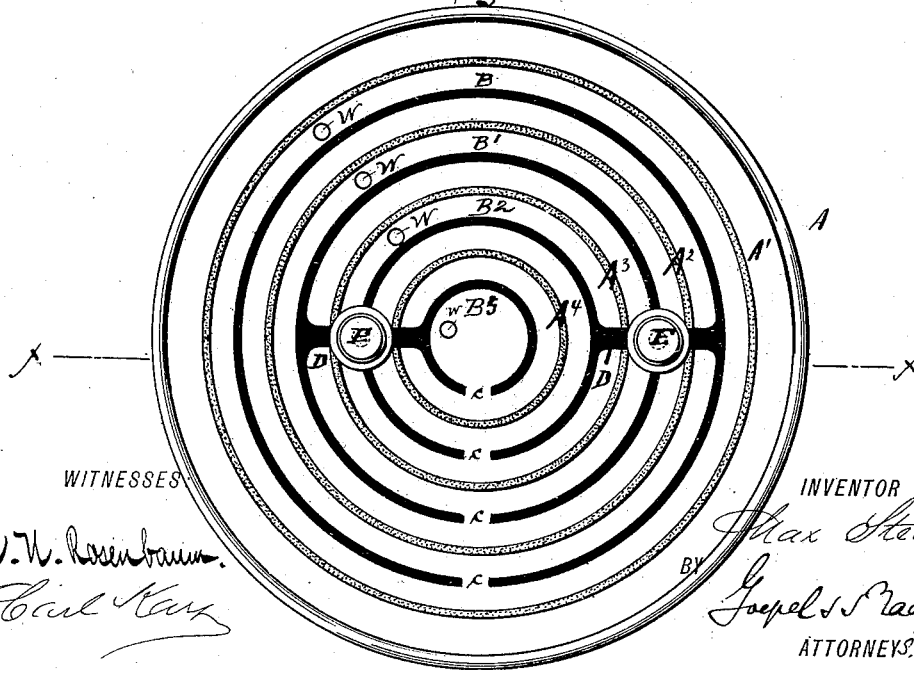

In the accompanying drawings, Figure 1 is a cross-sectional view of my improved secondary battery on the line $x\ x$, Fig. 2. Fig. 2 is a top view of the same.

Similar letters of reference indicate corresponding parts.

The vessel A for receiving the exciting-liquid and the elements may be made of glass, rubber, or other material. In the said vessel A, I place a porous cell, A', and into the cell A', I place a porous cell, A², and into the cell A² the porous cell A³, and into the latter the porous cell A⁴. In the annular space between the porous cells A and A', I place a ring, B, of sheet-lead, which ring is formed of a sheet of lead, which is bent circularly until the ends are at a short distance from each other, as at $c$. In the space between the porous cells A² A', I place a ring, B', of sheet-lead, and in the space between the cells A³ A², I place a ring, B², and into the innermost porous cell A⁴ the ring B³ of sheet-lead is placed. The spaces between the sheet-lead cylinders and the sides of the porous cells are then filled with oxide of lead. The alternate lead plates are connected by bars D, on which binding-screws E may be held. For example, the outermost lead cylinder, B, is connected with the third cylinder, B², and the second lead cylinder, B', is connected with the innermost lead cylinder, B³. The vessel A is then filled with exciting-liquid—such as diluted sulphurous acid—so that the entire element is submerged with the exception of extensions of the lead plates, on which extensions the cross-pieces uniting the lead plates are fastened. As the lead plates are cylindrical, I obtain a very large surface of lead in the smallest space. The lead plates cannot warp or creep, and the oxide of lead will not become detached from the plates. The battery can be charged very easily and rapidly, and consumes very slowly.

I have shown four cells and four circular leaden plates; but it is evident that a greater or less number can be used, according to the desired size and capacity of the battery.

W X W represent tubes which extend to the floors of the cells to permit air to enter.

If desired, granulated lead may be mixed with oxide of lead.

Having thus described my invention, I claim as new and desire to secure by Letters Patent—

1. A secondary battery formed of a series of porous cells, one within the other, circular lead plates or rings between the walls of the several cells, and oxide of lead packed in between the sides of the lead plates and the sides of the porous cells, substantially as shown and described.

2. In a secondary battery, the combination, with a series of porous cells, one placed within the other, of the circular lead rings in the spaces between the sides of the cells, the alternate rings being connected with each other, substantially as shown and described.

3. A secondary battery composed of a series of porous cells, one within the other, and oxide of lead between the walls of the several cells, substantially as shown and described.

In testimony that I claim the foregoing as my invention I have signed my name in presence of two subscribing witnesses.

MAX STECHER.

Witnesses:
WM. F. LUTZ,
MAX KUTTNER.